(12) United States Patent
Abouzour et al.

(10) Patent No.: US 8,200,845 B2
(45) Date of Patent: Jun. 12, 2012

(54) QUEUING OF INVOCATIONS FOR MOBILE WEB SERVICES

(75) Inventors: Eihab Abouzour, Waterloo (CA); Andrew James Quick, Kitchener (CA); Geno Coschi, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 692 days.

(21) Appl. No.: 11/640,854

(22) Filed: Dec. 19, 2006

(65) Prior Publication Data

US 2008/0147802 A1    Jun. 19, 2008

(51) Int. Cl.
*G06F 15/16* (2006.01)
(52) U.S. Cl. .................................. 709/246; 709/206
(58) Field of Classification Search .................. 709/206, 709/230, 246
See application file for complete search history.

(56) References Cited

U.S. PATENT DOCUMENTS

| | | | | |
|---|---|---|---|---|
| 5,801,604 | A * | 9/1998 | Fujino | 333/202 |
| 6,654,786 | B1 * | 11/2003 | Fox et al. | 709/203 |
| 6,665,711 | B1 * | 12/2003 | Boyle et al. | 709/219 |
| 6,754,470 | B2 * | 6/2004 | Hendrickson et al. | 455/67.11 |
| 7,181,521 | B2 * | 2/2007 | Knauerhase et al. | 709/224 |
| 7,289,788 | B2 * | 10/2007 | Shan | 455/410 |
| 7,363,342 | B1 * | 4/2008 | Wang et al. | 709/204 |
| 7,366,460 | B2 * | 4/2008 | O'Farrell et al. | 455/3.06 |
| 7,409,674 | B2 * | 8/2008 | Shenfield et al. | 717/114 |
| 7,454,459 | B1 * | 11/2008 | Kapoor et al. | 709/203 |
| 7,467,389 | B2 * | 12/2008 | Mukkamala et al. | 719/316 |
| 2005/0060431 | A1 * | 3/2005 | Lewontin | 709/246 |
| 2005/0144137 | A1 * | 6/2005 | Kumar et al. | 705/55 |
| 2006/0036754 | A1 * | 2/2006 | Itoh et al. | 709/230 |
| 2007/0233879 | A1 * | 10/2007 | Woods et al. | 709/227 |
| 2007/0237133 | A1 * | 10/2007 | Woods et al. | 370/352 |
| 2007/0239819 | A1 * | 10/2007 | Woods et al. | 709/201 |

OTHER PUBLICATIONS

"Mobile Client Software Factory—Jul. 2006", MSDN, retrieved from the internet on Aug. 28, 2006, http://msdn.microsoft.com/library/en-us/dnpag2/html/mcsflp.asp?frame=true.

* cited by examiner

*Primary Examiner* — Kristie Shingles
(74) *Attorney, Agent, or Firm* — Sterne, Kessler, Goldstein & Fox PLLC

(57) ABSTRACT

Methods and apparatuses for communications between web service applications and web services are described. A first interface is coupled between the application and a messaging system. A second interface is coupled between the messaging system and the web service. The first interface is configured to receive a web service request from the application, to format the web service request into a Simple Object Access Protocol (SOAP) request message, to include the SOAP request message in a first electronic message, and to transmit the first electronic message to the messaging system. The messaging system is configured to receive the first electronic message at a first node, to transmit the first electronic message across a communications network to a second node, and to couple the first electronic message from the second node to the second interface. The second interface is configured to receive the first electronic message from the messaging system, to extract the SOAP request message from the first electronic message, and to transmit the SOAP request message to the web service. Furthermore, a web service response is returned from the web service through the second interface, messaging system, and first interface, to the web service application.

27 Claims, 12 Drawing Sheets

QUEUING OF INVOCATIONS FOR MOBILE WEB SERVICES

BACKGROUND OF THE INVENTION

1. Field of the Invention

The present invention relates to web services, and more particularly, to communications between web services and mobile devices.

2. Background Art

Web services provide a standard means of interoperating between different software applications that run on a variety of platforms and/or frameworks. See "Web Services Architecture," W3C Working Group Note 11, February 2004. Entities communicate with web services over a network, such as the Internet, to access the resources provided by the web service. The entities and the web service exchange messages over the network.

An entity may attempt to initiate a communication with a web service when the web service is not accessible. For example, the web service may not be accessible because the web service website is currently down, the entity is operating in an offline (not Internet connected) mode, the network connection between the entity and web service is currently down, or for other reason. Typically, if communication with the web service is not possible at a particular time, the entity must re-attempt to communicate with the web service at a later time. However, such a delay in communication with the web service may be undesirable to the entity. For example, it may be time consuming, and resource intensive, for the entity to have to repeat attempts at communications with the web service until the communication successfully occurs.

Thus, what is needed are ways of efficiently communicating with web services in environments where the web services may not be continuously accessible, such as in unreliable communications environments.

BRIEF SUMMARY OF THE INVENTION

Methods, systems, and apparatuses are provided for web service applications to invoke web services over communications networks in the face of inconsistent connectivity.

In an aspect of the present invention, a web service interface is provided to interface the web service application with the web service. In an example aspect, the web service interface is a messaging system.

In aspects of the present invention, a method and system for communicating between web service applications and web services is provided. A first interface is coupled between the application and a messaging system. A second interface is coupled between the messaging system and the web service. The first interface is configured to receive a web service request from the application, to format the web service request into a Simple Object Access Protocol (SOAP) request message, to include the SOAP request message in a first electronic message, and to provide the first electronic message to the messaging system. The messaging system is configured to receive the first electronic message at a first node, to transmit the first electronic message across a communications network to a second node, and to couple the first electronic message from the second node to the second interface. The second interface is configured to receive the first electronic message from the messaging system, to extract the SOAP request message from the first electronic message, and to transmit the SOAP request message to the web service.

In a further aspect, the second interface is configured to receive a web service response from the web service, the web service response including a SOAP response message. The second interface is configured to include the SOAP response message in a second electronic message, and to provide the second electronic message to the messaging system. The messaging system is configured to receive the second electronic message at the second node, to transmit the second electronic message across the communications network to the first node, and to provide the second electronic message from the first node to the first interface. The first interface is configured to receive the second electronic message from the messaging system, to extract the SOAP response message from the second electronic message, to decode the SOAP response message into response information, and to transmit the response information to the web service application.

In aspects, the communications network may provide an occasional/intermittent connection. However, according to aspects of the present invention, the web service application may still invoke the web service without having to repeat the invocation due to communication network outages.

In another aspect of the present invention, an interface is provided between a web service application and a messaging system. The interface includes a SOAP request generator and a message generator. The SOAP request generator is configured to receive a web service request from the application and to format the web service request into a SOAP request message. The message generator is configured to generate a first electronic message that includes the SOAP request message. The first electronic message is transmitted through the messaging system.

In an aspect, the interface between the web service application and the messaging system further includes a SOAP response extractor and a SOAP decoder. The SOAP response extractor is configured to extract a SOAP response message from a second electronic message received from the messaging system. The SOAP decoder is configured to decode the SOAP response message into response information.

In another aspect of the present invention, an interface between a messaging system and a web service is provided. The interface includes a SOAP request extractor and a network interface module. The SOAP request extractor is configured to extract a SOAP request message from a first electronic message received from the messaging system. The network interface module is configured to transmit the SOAP request message to the web service according to a network protocol, such as Hypertext Transfer Protocol (HTTP).

In an aspect, the interface between the messaging system and the web service further includes a message generator. The message generator is configured to include a SOAP response message received from the web service in a second electronic message. The interface is further configured to transmit the second electronic message to the messaging system.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1-3 shows block diagrams of a web service communications system, where a web service application communicates with a web service over a communications network.

FIGS. 4, 5, 6A, and 6B show block diagrams of web service communications systems, according to example embodiments of the present invention.

Figure 1:
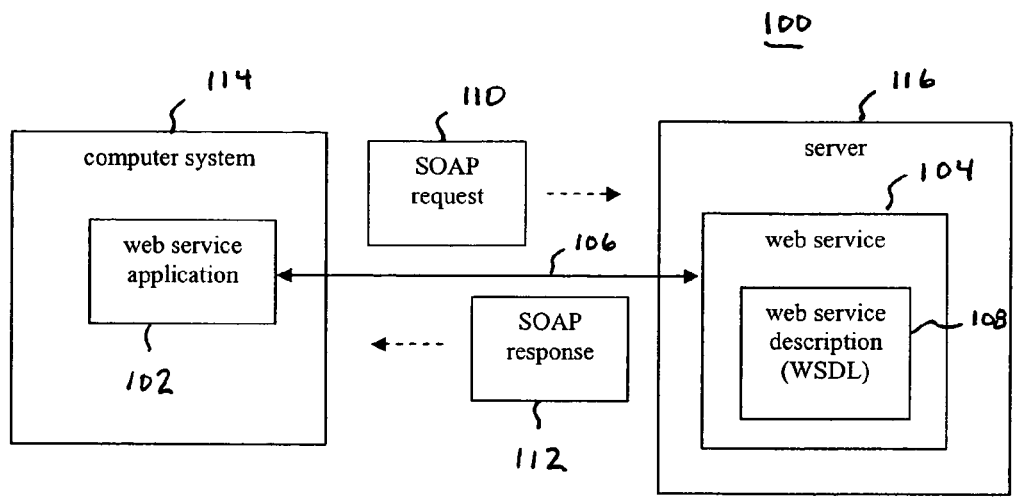

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the Present Invention

Methods, systems, and apparatuses are described below for communications between an application and a web service.

The example embodiments described herein are provided for illustrative purposes, and are not limiting. Further structural and operational embodiments, including modifications/alterations, will become apparent to persons skilled in the relevant art(s) from the teachings herein.

Web services provide a standard means of interoperating between different software applications that run on a variety of platforms and/or frameworks. See "Web Services Architecture," W3C Working Group Note 11, February 2004 (hereinafter "the Working Group"), which is incorporated by reference herein in its entirety. A web service is generally a software system operating on a server that enables machine-to-machine interaction, enabling a web service application operating in a computer system to access the functionality of the web service.

For example, FIG. 1 shows a web service communications system 100, where a web service application 102 communicates with a web service 104 over communications network 106. Web service application 102 resides in a computer system 114. Web service 104 resides in a server 116. Web service 104 provides a web service description 108, which is a machine processable specification of an interface provided by web service 104. Web service description 108 is typically written in Web Service Description Language (WSDL). Web service application 102 communicates with web service 104 in a manner dictated by web service description 108, in messages formatted according to Service Oriented Architecture Protocol (SOAP).

For example, FIG. 1 shows web service application 102 transmitting a SOAP request 110 over communications network 106 to web service 104. SOAP request 110 specifies methods/functions of web service 104, and corresponding arguments/parameters. Web service 104 processes SOAP request 110, including performing the specified methods/functions using the corresponding arguments/parameters, and transmits a SOAP response 112 to web service application 102 over communications network 106. SOAP response 112 includes results corresponding to the queries of SOAP request 110.

Figure 2:
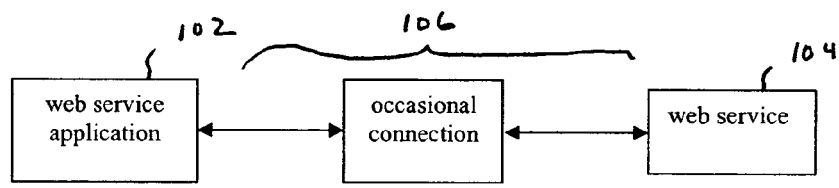
Figure 3:
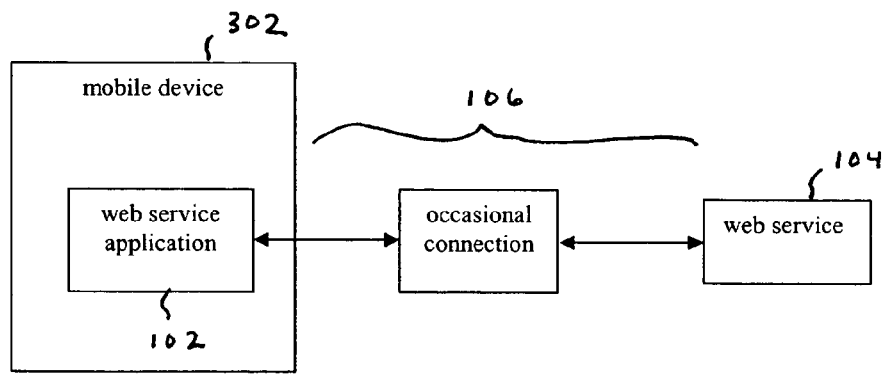

SOAP messages are typically conveyed over communications network 106 using a variety of network protocols, including HTTP, SMTP, FTP, RMI/IIOP, etc. Communications network 106 may include any type of communications network, including a local area network (LAN) or wide area network (WAN), such as the Internet. As shown in FIG. 2, communication network 106 may provide an occasional connection between web service application 102 and web service 104 for reasons well known to persons skilled in the relevant art(s). For example, communications network 106 may suffer occasional network outages. In another example, web service 104 itself may periodically go offline, such that an occasional connection exists between web service application 102 and web service 104. In still another example, as shown in FIG. 3, computer system 114 in which web service application 102 resides is a mobile device 302 that is configured to operate in an online or offline mode. In an offline mode, mobile device 302 is decoupled from communications network 106. In examples, mobile device 302 may be a mobile computing device such as a PALM device, a BLACKBERRY device, a laptop computer, a personal digital assistant (PDA), a cell phone, etc.

An occasional connection between web service application 102 and web service 104, as indicated in FIGS. 2 and 3, is undesirable. Conventionally, when web service application 102 is not able to communicate with web service 104 at a given time, web service application 102 must wait until a later time to reattempt to send SOAP request 110, which may waste time, resources, opportunities, etc., as is typical in a polling architecture.

Figure 4:
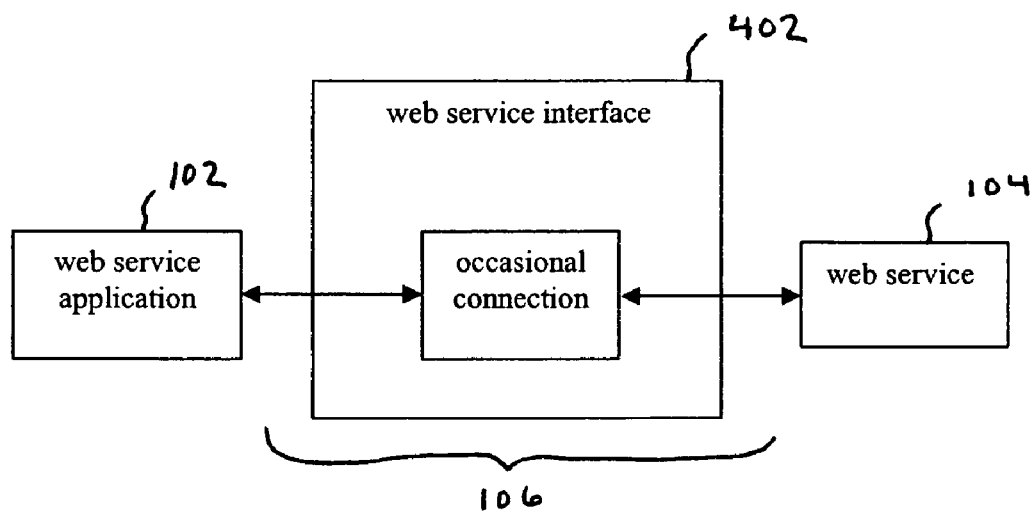

FIG. 4 shows a web service communications system 400, according to an example embodiment of the present invention. As shown in FIG. 4, a web service interface 402 is coupled between web service application 102 and web service 104. Web service interface 402 is configured to enable web service application 102 to perform communications with web service 104 over communications network 106, even though web service application 102 and web service 104 may suffer occasional disruptions in communication. Thus, for example, even if a connection does not exist between web service application 102 and web service 104 at a given time, web service application 102 is still enabled to execute SOAP request 110 at that time, so that SOAP request 110 is transmitted at a subsequent time. Furthermore, web service 104 is enabled to queue SOAP response 112 to web service application 102 even if a connection does not exist between web service application 102 and web service 104 at that time. Example embodiments for web service communications system 400 are further described below.

Figure 5:
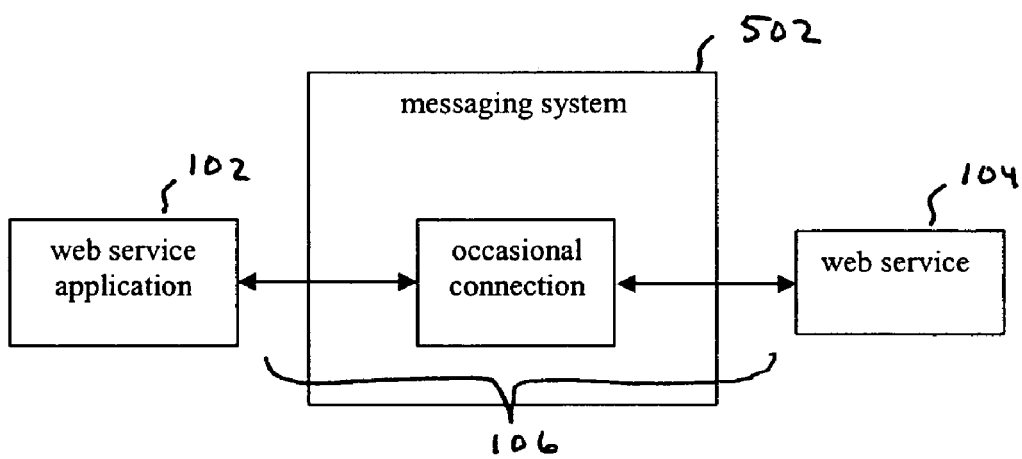

For example, in an embodiment, a conventionally available or proprietary messaging system may be used for web service communications system 400. FIG. 5 shows an example embodiment for web service communications system 400, where web service interface 402 is a messaging system 502. Messaging system 502 is configured to transmit messages across communications network 106. Messaging system 502 is used by web service application 102 to transmit SOAP request 110 to web service 104, and is used by web service 104 to transmit SOAP response 112 to web service application 102. Messaging system 502 enables transmission of such messages even in the presence of communications network 106, which provides an occasional connection. In embodiments, messaging system 502 may include a variety of proprietary or conventional messaging systems/protocols such as Java Message Service (JMS), Post Office Protocol (POP), Internet Message Access Protocol (IMAP) or other systems/protocols.

Figure 6A:
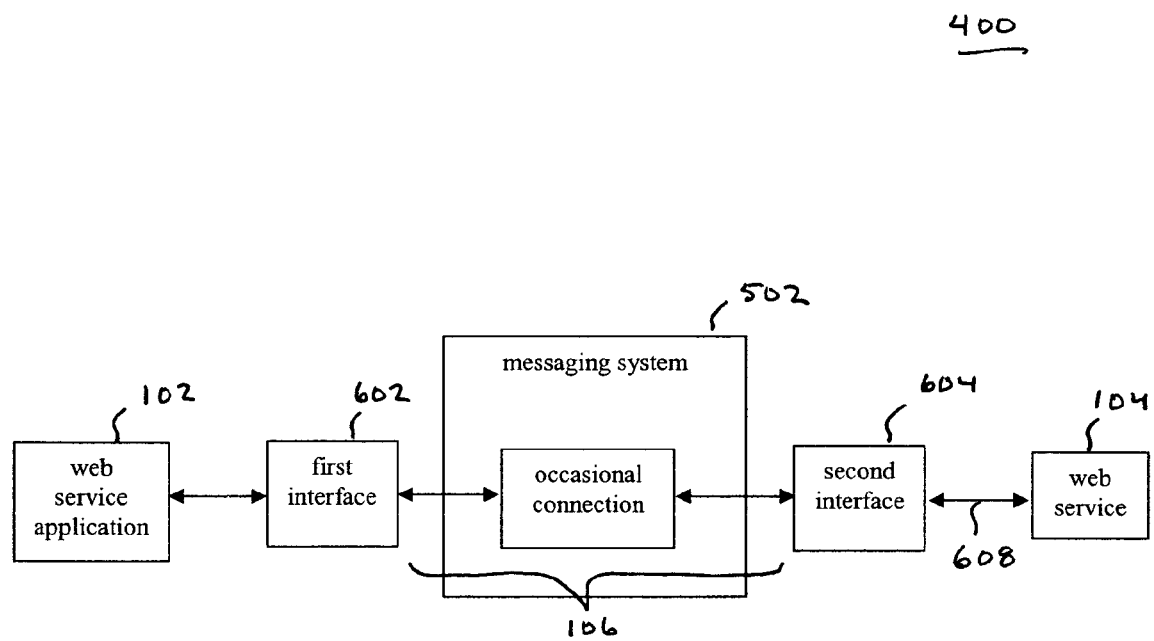

FIG. 6A shows a block diagram of web service communications system 400 incorporating messaging system 502, according to an example embodiment of the present invention. As shown in the embodiment of FIG. 6A, a first interface 602 is coupled between web service application 102 and messaging system 502, and a second interface 604 is coupled between messaging system 502 and web service 104. In an embodiment, web service application 102 and first interface 602 are located in a common device, such as a personal computer, a server, or a mobile device (such as mobile device 302 shown in FIG. 3). Alternatively, they may be located in separate devices. In an embodiment, second interface 604 communicates with web service 104 over a communication link 608.

Figure 6B:
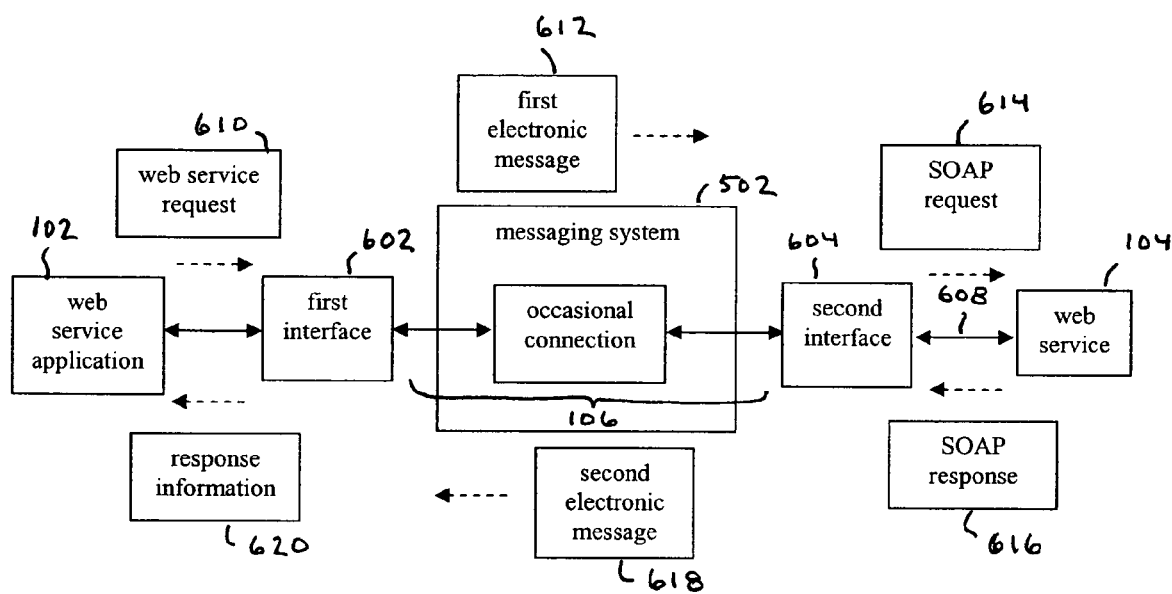

FIG. 6B shows an example communication between web service application 102 and web service 104 using first and second interfaces 602 and 604, according to an embodiment of the present invention. In FIG. 6B, first interface 602 receives a web service request 610 from web service application 102, formats the web service request into a Simple Object Access Protocol (SOAP) request message (similar to SOAP request 110), and includes the SOAP request message in an electronic message 612. First interface 602 generates electronic message 612 in a message format typically carried by messaging system 502, such as an email. The SOAP request message may be included in electronic message 612 in any manner, included as an attachment (e.g., an email attachment), in the body of electronic message 612 (e.g., as text, binary, and/or encrypted form), or in any other manner as would be known to persons skilled in the relevant art(s).

Electronic message 612 is transmitted from first interface 602 to messaging system 502. Messaging system 502 transmits electronic message 612 to second interface 604 through communications network 106 in a manner normally provided by messaging system 502. For example, if electronic message 612 is an email, messaging system 502 transmits electronic message 612 as an email to second interface 604.

Second interface 604 is configured to receive electronic message 612 from messaging system 502, to extract the SOAP request message from electronic message 502, and to transmit the SOAP request message to web service 104 as SOAP request 614. Second interface 604 transmits SOAP request 614 to web service 104 according to HTTP or other protocol mentioned elsewhere herein or otherwise known or future developed. For example, in an embodiment, second interface 604 transmits SOAP request 614 to web service 104 in a manner conventionally used by web service application 102 to communicate directly with web service 104.

Web service 104 generates a web service response to SOAP request 614, which includes a SOAP response message shown as SOAP response 616 in FIG. 6B. Second interface 604 receives SOAP response 616, and includes SOAP response 616 in a second electronic message 618. Second interface 604 generates second electronic message 618 in a message format typically carried by messaging system 502, such as an email. SOAP response 616 may be included in second electronic message 618 in any manner, included as an attachment (e.g., an email attachment), in the body of second electronic message 618 (e.g., as text, binary, and/or encrypted form), or in any other manner as would be known to persons skilled in the relevant art(s).

Second electronic message 618 is transmitted by second interface 604 to messaging system 502. Messaging system 502 transmits second electronic message 618 to first interface 602 through communications network 106 in a manner normally provided by messaging system 502. For example, if messaging system 502 is an email delivery system, and second electronic message 618 is an email, messaging system 502 transmits second electronic message 618 as an email to first interface 602.

First interface 602 receives second electronic message 618 from messaging system 502. First interface extracts the SOAP response message from second electronic message 618, and decodes the SOAP response message into response information. First interface 602 transmits the response information to web service application 102.

Figure 7A:
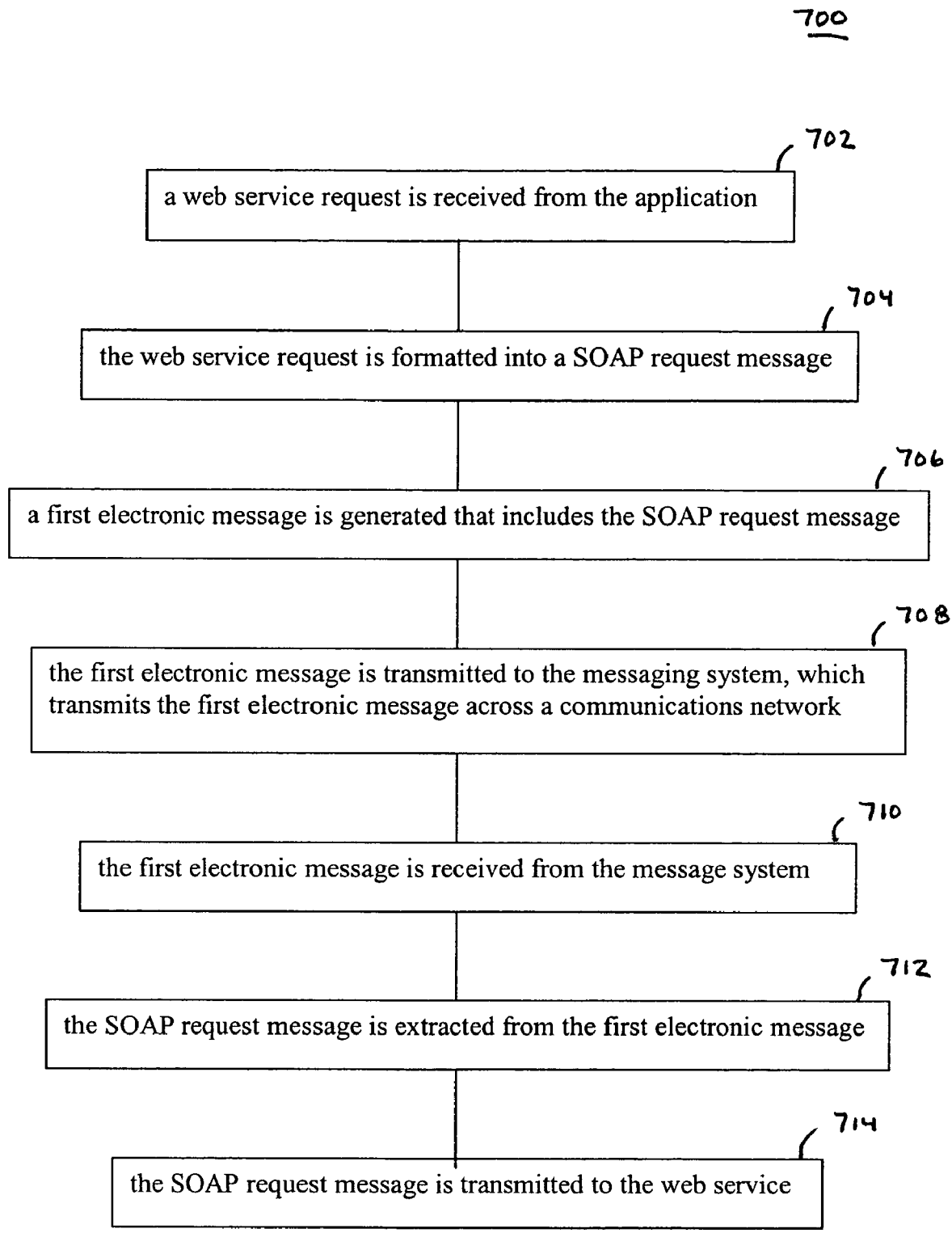
FIGS. 7A and 7B show a flowchart providing example steps for an application to invoke a web service, according to example embodiments of the present invention.
Figure 7B:
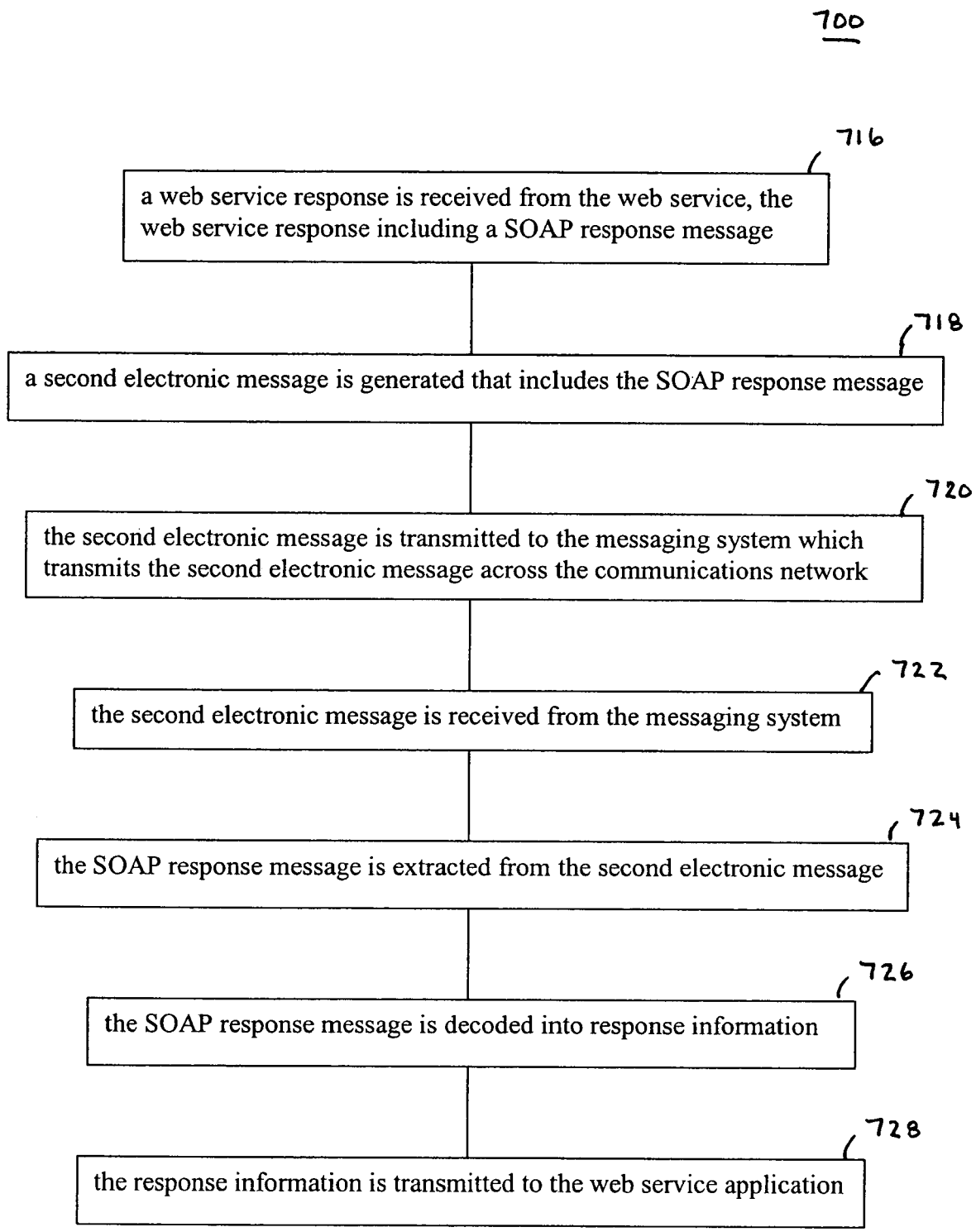

FIGS. 7A and 7B show a flowchart 700 providing example steps for an application, such as web service application 102, to invoke a web service, such as web service 104, according to example embodiments of the present invention. FIGS. 7A and 7B are described below with reference to FIGS. 6B and 8-10, for illustrative purposes. Further structural and operational embodiments will be apparent to persons skilled in the relevant art(s) based on the following discussion.

FIG. 7A illustrates a web service request being forwarded to a web service, according to an embodiment of the present invention. In step 702, a web service request is received from the application. For example, as described above with respect to FIG. 6B, web service request 610 is received from web service application 102. Web service request 610 may be generated by web service application 102 in any manner, and may be formatted in any manner, as would be known to persons skilled in the relevant art(s). For example, in an embodiment, web service request 610 may be generated by one or more proxy classes compiled into web service application 102.

Figure 8:
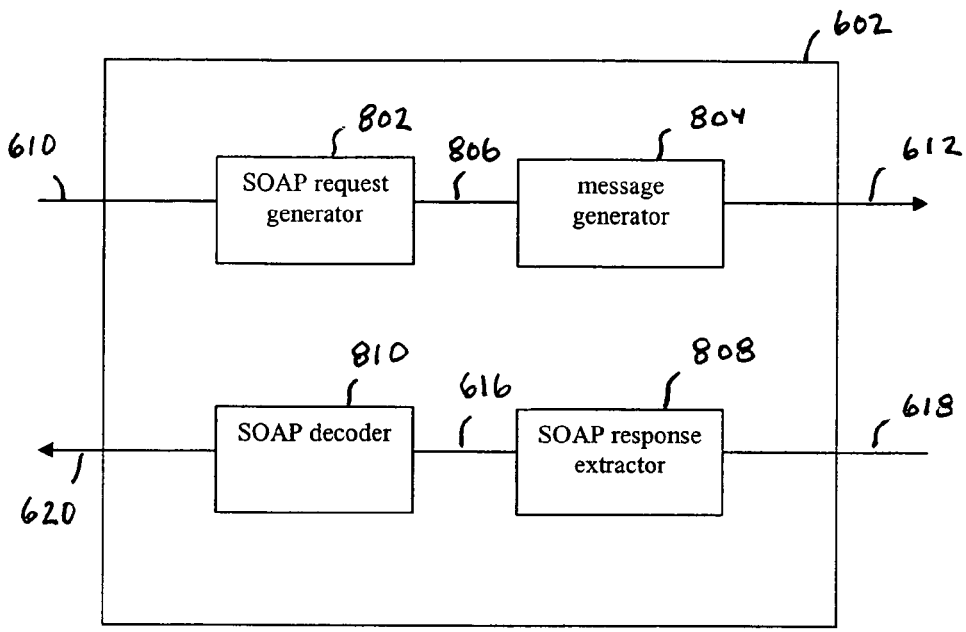
FIG. 8 shows a block diagram of an interface between a web service application and a messaging system, according to an example embodiment of the present invention.

In step 704, the web service request is formatted into a Simple Object Access Protocol (SOAP) request message. FIG. 8 shows an example embodiment for first interface 602. In the embodiment of FIG. 8, first interface 602 includes a SOAP request generator 802 and a message generator 804. SOAP request generator 802 receives web service request 610, and formats web service request 610 into a SOAP request message 806. For example, web service request 610 provides web service methods and corresponding arguments, which SOAP request generator 802 formats into a SOAP message, as would be known to persons skilled in the relevant art(s).

In step 706, a first electronic message is generated that includes the SOAP request message. For example, message generator 804 of FIG. 8 receives SOAP request message 806, and generates first electronic message 612, which includes SOAP request message 806. First interface 602 transmits first electronic message 612 to messaging system 502, as shown in FIG. 6B.

First interface 602, including SOAP request generator 802 and/or message generator 804, may be implemented in hardware, software, firmware, or any combination thereof. For example, first interface 602 may be implemented as an application programming interface (API), as would be known to persons skilled in the relevant art(s). In such an embodiment, web service request 610 may be received by first interface 602 as an API function call.

In step 708, the first electronic message is transmitted to the messaging system, which transmits the first electronic message across a communications network. As described above, messaging system 502 can be any type of messaging system. Example embodiments for messaging system 502 are further described below.

In step 710, the first electronic message is received from the message system. For example, as shown in FIG. 6B, first electronic message 612 is received by second interface 604 from messaging system 502.

Figure 9:
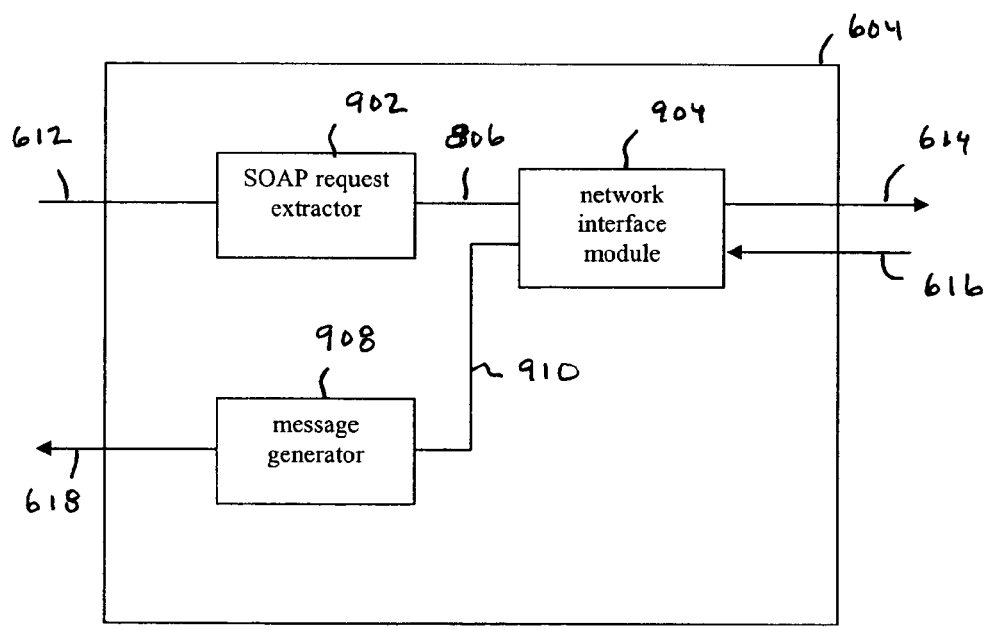
FIG. 9 shows a block diagram of an interface between a messaging system and a web service, according to an example embodiment of the present invention.

In step 712, the SOAP request message is extracted from the first electronic message. FIG. 9 shows an example embodiment for second interface 604. In the embodiment of FIG. 9, second interface 604 includes a SOAP request extractor 902 and a network interface module 904. SOAP request extractor 902 extracts SOAP request message 806 from first electronic message 612. For example, if first electronic message 612 is an email message, SOAP request message 806 may be extracted from the body of first electronic message 612, from an attachment of first electronic message 612, or in another manner.

In step 714, the SOAP request message is transmitted to the web service. For example, network interface module 904 receives SOAP message 806, and transmits SOAP request message 806 to web service 104 as SOAP request 614. Network interface module 904 can be configured to transmit SOAP request 614 according to any network protocol, including those described elsewhere herein or otherwise known. For example, in an embodiment, the SOAP request 614 is transmitted by network interface module 904 according to HTTP.

Second interface 604, including SOAP request extractor 902 and/or network interface module 904, may be implemented in hardware, software, firmware, or any combination thereof. For example, second interface 604 may be implemented as an application programming interface (API), as would be known to persons skilled in the relevant art(s). In another example, network interface module 904 may be a standard or special purpose network interface for interfacing with a communication link, including a LAN or WAN network. Example network interfaces are described further below.

FIG. 7B illustrates a web service response being returned to the requesting application, according to an example embodiment. In step 716, a web service response is received from the web service, the web service response including a SOAP response message. For example, as described above with respect to FIG. 6B, a web service response is received by second interface 604 from web service 104, including SOAP response 616. For example, in an embodiment, SOAP response 616 is received from web service 104 by network interface module 904 of second interface 604 according to HTTP or other network protocol.

In step 718, a second electronic message is generated that includes the SOAP response message. For example, as shown in FIG. 9, second interface 604 may include a message generator 908. Message generator 908 receives SOAP response 616, and includes the SOAP message of SOAP response 616 in second electronic message 618 in a manner described elsewhere herein or otherwise known. Second interface 604 transmits second electronic message 618 to messaging system 502.

As described above for second interface 604, message generator 908 may be implemented in hardware, software, firmware, or any combination thereof. For example, message generator 908 may be implemented as an application programming interface (API), as would be known to persons skilled in the relevant art(s).

In step 720, the second electronic message is transmitted to the messaging system, where the messaging system is configured to transmit the second electronic message across the communications network.

In step 722, the second electronic message is received from the messaging system. For example, as shown in FIG. 6B, second electronic message 618 is received by first interface 602 from messaging system 502.

In step 724, the SOAP response message is extracted from the second electronic message. For example, as shown in FIG. 8, first interface 602 may include a SOAP response extractor 808 and a SOAP decoder 810, according to an embodiment of the present invention. SOAP response extractor 808 extracts the SOAP response message of SOAP response 616 from second electronic message 618. For example, if second electronic message 618 is an email message, SOAP response 616 may be extracted from the body of second electronic message 618, from an attachment of second electronic message 618, or in other manner.

In step 726, the SOAP response message is decoded into response information. For example, as shown in FIG. 8, SOAP decoder 810 receives the extracted SOAP response 616 from SOAP response extractor 808. SOAP decoder 810 decodes the extracted SOAP response 616 into response information 620. SOAP decoder 810 may be configured to decode a SOAP response into response information 620 in any suitable manner, as would be understood by persons skilled in the relevant art(s).

As described above for first interface 602, SOAP response extractor 808 and/or SOAP decoder 810 may be implemented in hardware, software, firmware, or any combination thereof. For example, SOAP response extractor 808 and/or SOAP decoder 810 may be implemented as an application programming interface (API), as would be known to persons skilled in the relevant art(s).

In step 728, the response information is transmitted to the web service application. wherein the interface is configured to transmit the response information to the web service application. For example, as shown in FIG. 6B, response information 620 is transmitted to web service application 102 by first interface 602. Response information 620 includes results of the web service invocation that may be used by web service application 102.

Figure 10:
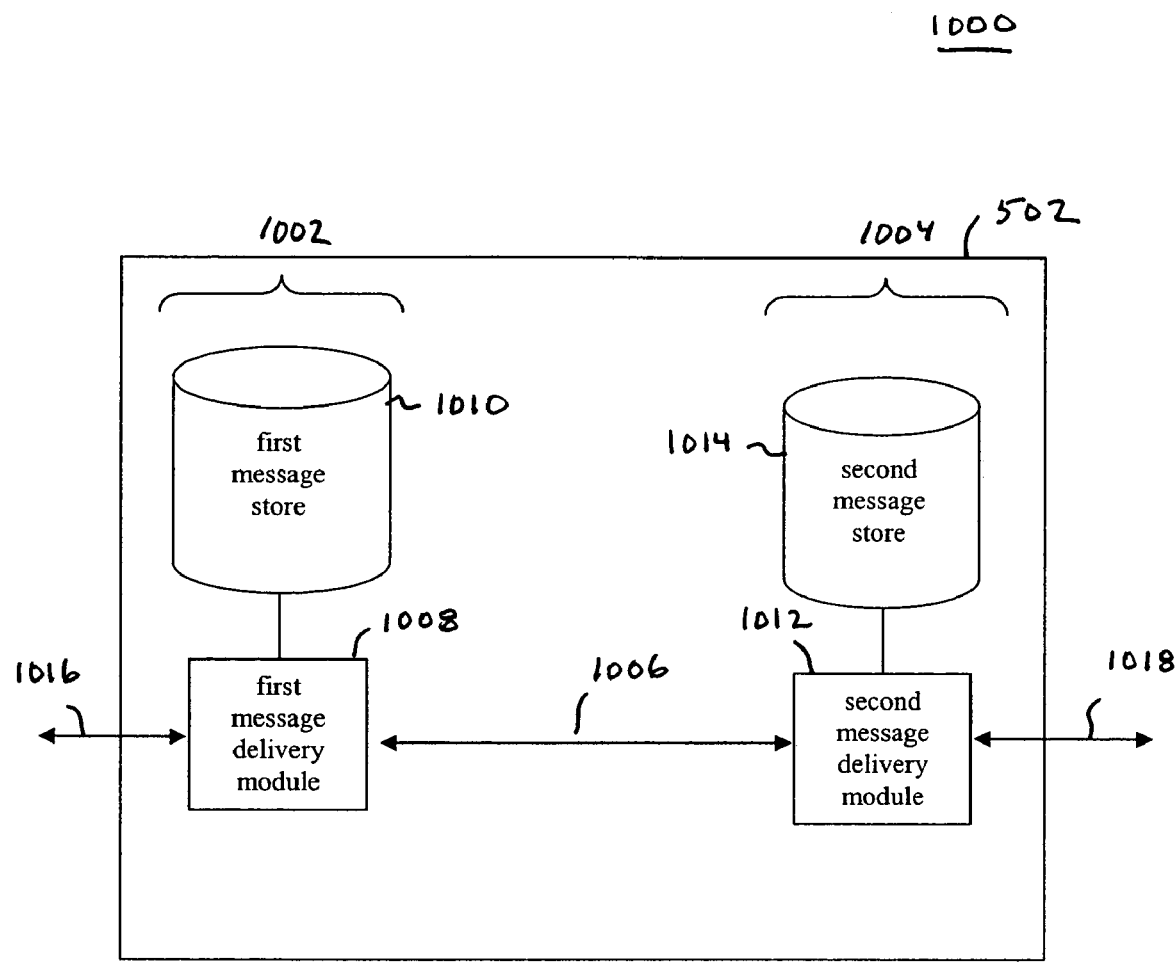
FIG. 10 shows a block diagram of an example messaging system compatible with an embodiment of the present invention.

As described above, a variety of messaging systems may be used for messaging system 502. For example, FIG. 10 shows a messaging system 1000 that may be used for messaging system 502, according to an embodiment of the present invention. As shown in FIG. 10, messaging system 1000 includes first and second nodes 1002 and 1004. First and second nodes 1002 and 1004 are configured to communicate with each other across a communication network 1006, which is an example of communication network 106. Thus, communication network 1006 may be occasionally/intermittently connected between first and second nodes 1002 and 1004. First and second nodes 1002 and 1004 enable messages to be sent across messaging system 1000 despite the intermittent connection. First and second nodes 1002 and 1004 are typically located on separate computer systems. An example of communication network 1006 is the Internet.

First node 1002 includes a first message delivery module 1008 and a first message store 1010. Second node 1004 includes a second message delivery module 1012 and a second message store 1014. First message delivery module is coupled to first message store 1010, and is coupled to first interface 602 by communication link 1016, and second message delivery module 1012 is coupled to second message store 1014, and is coupled to second interface 604 by communication link 1018.

Figure 11:
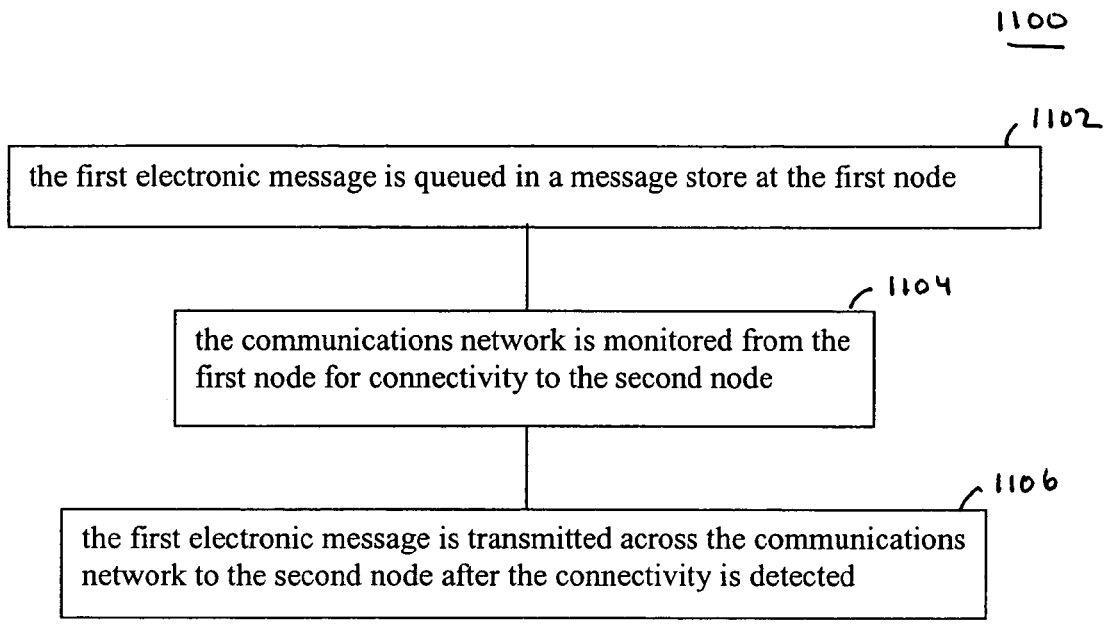
FIGS. 11 and 12 show a flowchart providing example steps for operation of the messaging system of FIG. 10, according to an embodiment of the present invention.
Figure 12:
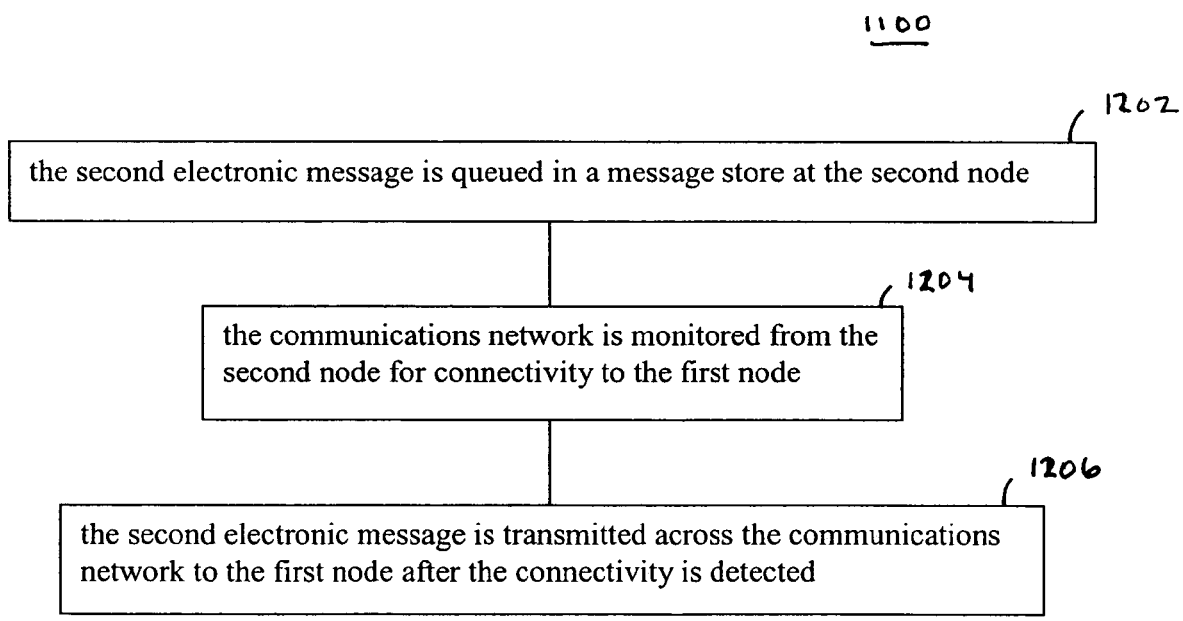

FIGS. 11 and 12 show a flowchart 1100 providing example steps for operation of messaging system 1000. Further structural and operational embodiments will be apparent to persons skilled in the relevant art(s) based on the following discussion.

FIG. 11 illustrates a first electronic message, such as first electronic message 612, being transmitted across the communications network encompassed by messaging system 1000, from first node 1002 to second node 1004. In step 1102, the first electronic message is queued in a message store at the first node. For example, first electronic message 612 may be received by first message delivery module 1008 over communication link 1016. First message store 1010 may be used by first message delivery module 1008 to temporarily store first electronic message 612.

In step 1104, the communications network is monitored from the first node for connectivity to the second node. For example, first message delivery module 1008 may monitor communications network 1006 for connectivity to second node 1004. If connectivity is not detected by first message delivery module 1008, first electronic message 612 remains queued in first message store 1010. If connectivity is detected by first message delivery module 1008, first message delivery module 1008 may read first electronic message 612 from first message store 1010 for delivery. Such network monitoring may be performed in a manner well known to persons skilled in the relevant art(s).

In step 1106, the first electronic message is transmitted across the communications network to the second node after the connectivity is detected. For example, when connectivity is detected by first message delivery module 1008, first message delivery module 1008 may transmit first electronic message 612 across communications network 1006 to second node 1004.

Note that in an embodiment, web service application 102, first interface 602, and a portion of messaging system 1000 reside in a common device, such as a computer, server, or mobile device (such as mobile device 302 shown in FIG. 3). For example, in a mobile device embodiment, first message store 1010 and first message delivery module 1008 may reside, at least partially, in a mobile device with web service application 102 and first interface 602. First message delivery module 1008 may be used to perform message synchronization operations for the mobile device, over communications network 1006. Alternatively, first message store 1010 and first message delivery module 1008 may reside in one or more separate devices from web service application 102 and first interface 602.

FIG. 12 illustrates a second electronic message, such as second electronic message 612 being transmitted across the communications network from second node 1004 to first node 1002. In step 1202, the second electronic message is queued in a message store at the second node. For example, second electronic message 618 may be received by second message delivery module 1012 over communication link 1018 from second interface 604. Second message store 1014 may be used by second message delivery module 1012 to temporarily store second electronic message 618.

In step 1204, the communications network is monitored from the second node for connectivity to the first node. For example, second message delivery module 1012 may monitor communications network 1006 for connectivity to first node 1002. If connectivity is not detected by second message delivery module 1012, second electronic message 618 remains queued in second message store 1014. If connectivity is detected by second message delivery module 1012, second message delivery module 1012 may read second electronic message 618 from second message store 1012 for delivery.

In step 1206, the second electronic message is transmitted across the communications network to the first node after the connectivity is detected. For example, when connectivity is detected by second message delivery module 1012, second message delivery module 1012 may transmit second electronic message 618 across communications network 1006 to first node 1002.

Systems suitable for first and second delivery modules 1008 and 1012, and first and second message stores 1010 and 1014 are well known to persons skilled in the relevant art(s). First and second delivery modules 1008 and 1012 may be implemented in hardware, software, firmware, or in any combination thereof.

Figure 13:
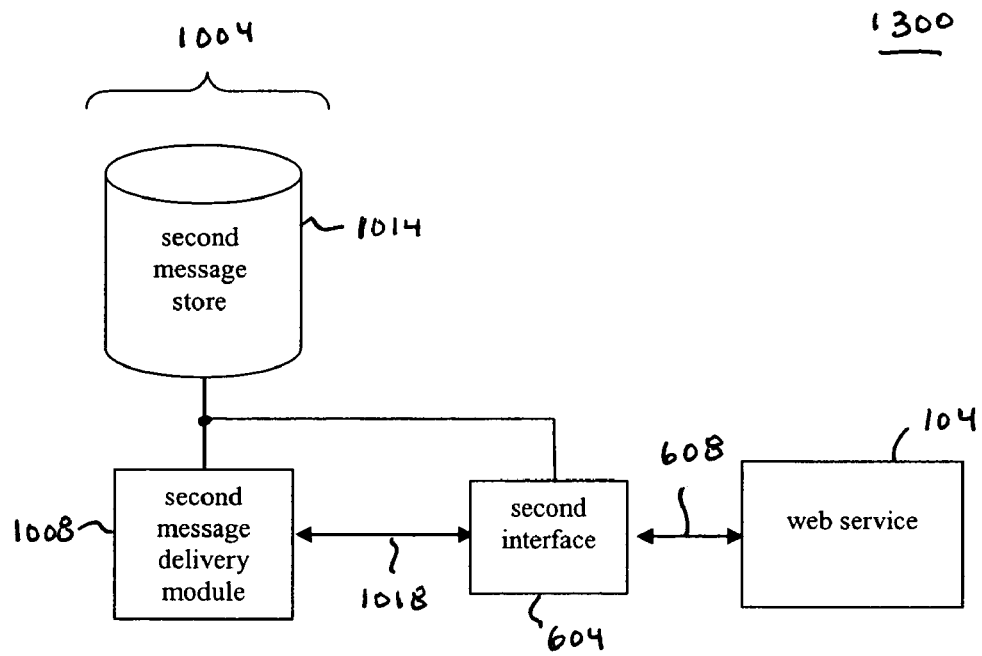
FIG. 13 shows a block diagram of a system for queuing communications with a web service, according to an example embodiment of the present invention.
Figure 14:
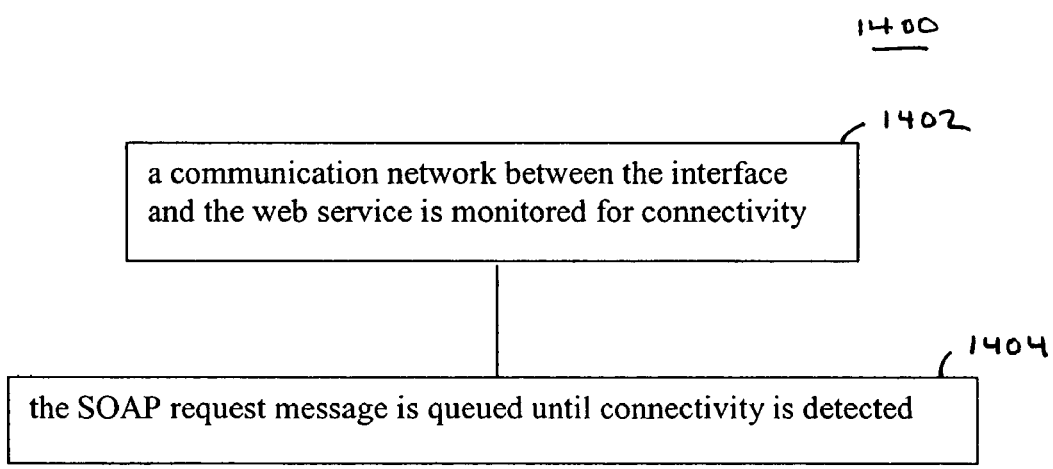
FIG. 14 shows a flowchart providing example steps for queuing communications with a web service, according to an embodiment of the present invention.

Note that connectivity between second interface 604 and web service 104 may not always be present, and thus step 714 of flowchart 700 may need to be delayed. FIG. 13 shows a system 1300 for queuing communications with web service 104 at second interface 604, according to an example embodiment of the present invention. FIG. 14 shows a flowchart 1400 providing example steps for queuing communications with a web service, according to an embodiment of the present invention. According to FIG. 14, second interface 604 queues SOAP request 614 prior to providing it to web service 104. This may be necessary if web service 104 is currently down, if communication link 608 between second interface 604 and web service 104 is currently down, or for other reason.

In step 1402, a communication network between the interface and the web service is monitored for connectivity. For example, network interface module 904 (of FIG. 9) of second interface 604 may monitor communications network 1006 for connectivity to web service 104.

In step 1404, the SOAP request message is queued until connectivity is detected. If connectivity is not detected, SOAP request 614 may be queued in second message store 1014 (or other storage), which may be coupled to second interface 604 in an embodiment. For example, in an embodiment, second node 1004 and second interface 604 may reside in the same or closely associated computer systems. If connectivity is detected by network interface module 904, second interface 604 may read SOAP request 614 from second message store 1014 for delivery to web service 104. Thus, after connectivity is detected, step 714 of flowchart 700 may be performed.

Figure 15:
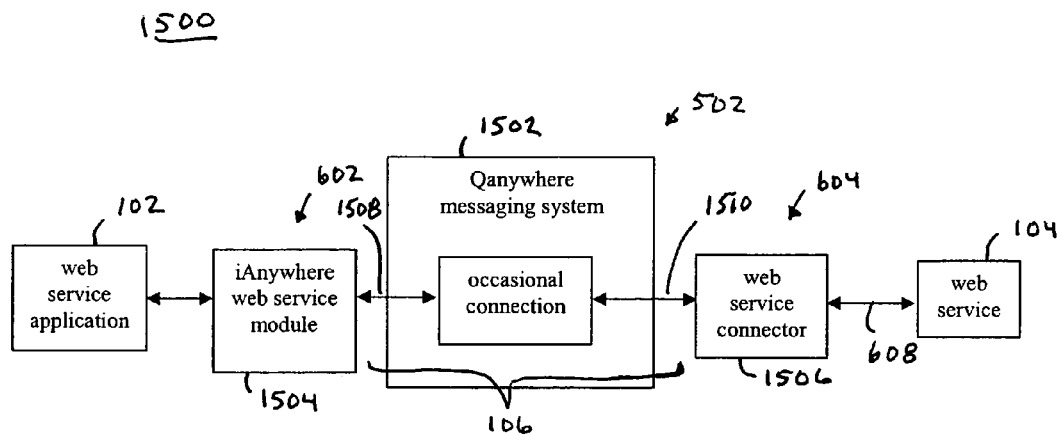
FIG. 15 shows a block diagram of another example web service communications system, according to an embodiment of the present invention.

As described above, a variety of messaging systems are suitable for messaging system 502. For example, in an embodiment, the QAnywhere messaging system developed by iAnywhere Solutions, Inc., of Waterloo, Calif., may be used for messaging system 502. For example, FIG. 15 shows a web service communications system 1500 that incorporates QAnywhere messaging system 1502 for messaging system 502. Furthermore, system 1500 includes an iAnywhere Web Service module 1504 for first interface 602 and a web service connector 1506 for second interface 602, both developed by iAnywhere Solutions, Inc.

Figure 16:
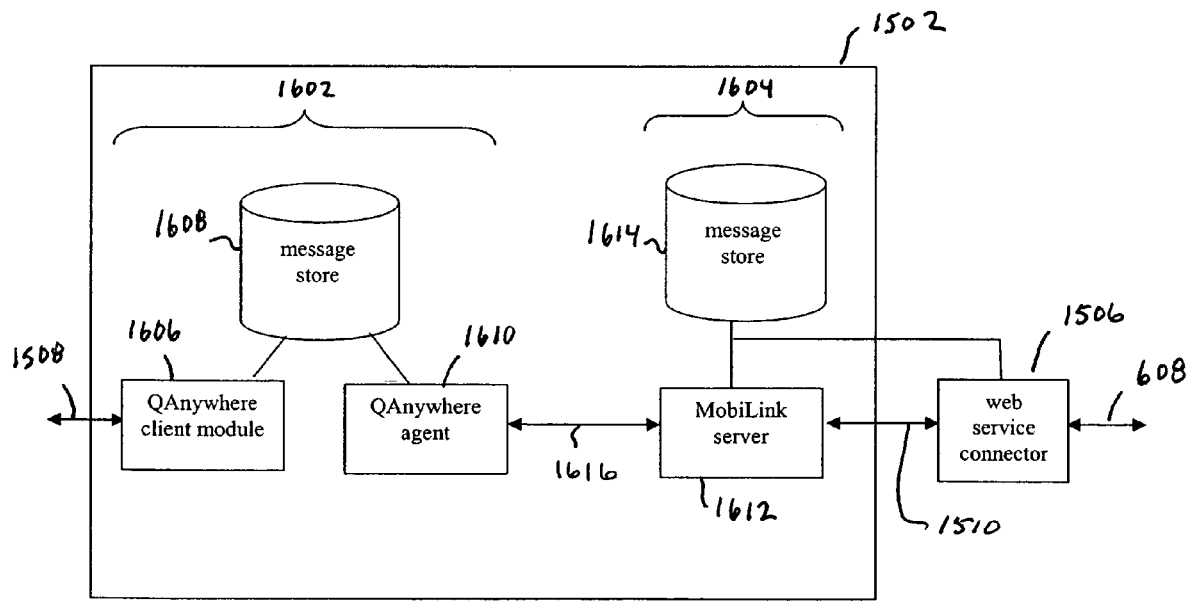
FIG. 16 shows a block diagram of another example messaging system compatible with an embodiment of the present invention.

FIG. 16 shows an example block diagram of QAnywhere Messaging System 1502, according to an embodiment of the present invention. As shown in FIG. 16, QAnywhere Messaging System 1502 includes a first node 1602 and a second node 1604 that transmit messages to each other across a communications network 1616, similarly to messaging systems 502 described above with respect to FIG. 10. First node 1602 includes a QAnywhere client module 1606, a first message store 1608, and a QAnywhere agent 1610. Portions or all of first node 1602 shown in FIG. 16 may be located in a mobile device with web service application 102 and iAnywhere web service module 1504. Second node 1604 includes a MobiLink server 1612 and a second message store 1614. QAnywhere Messaging System 1502 is configured to perform message synchronization for client devices, including mobile devices. Further details of QAnywhere Messaging System 1502, and the elements of QAnywhere Messaging System 1502 shown in FIG. 16, are available at the iAnywhere Solutions website. Additional description is provided in co-pending U.S. application Ser. No. 10/906,065, titled "System and Methodology for Extending Enterprise Messaging Systems to Mobile Devices," filed Feb. 1, 2005, which is incorporated by reference herein in its entirety.

Example Computer Implementation

Figure 17:
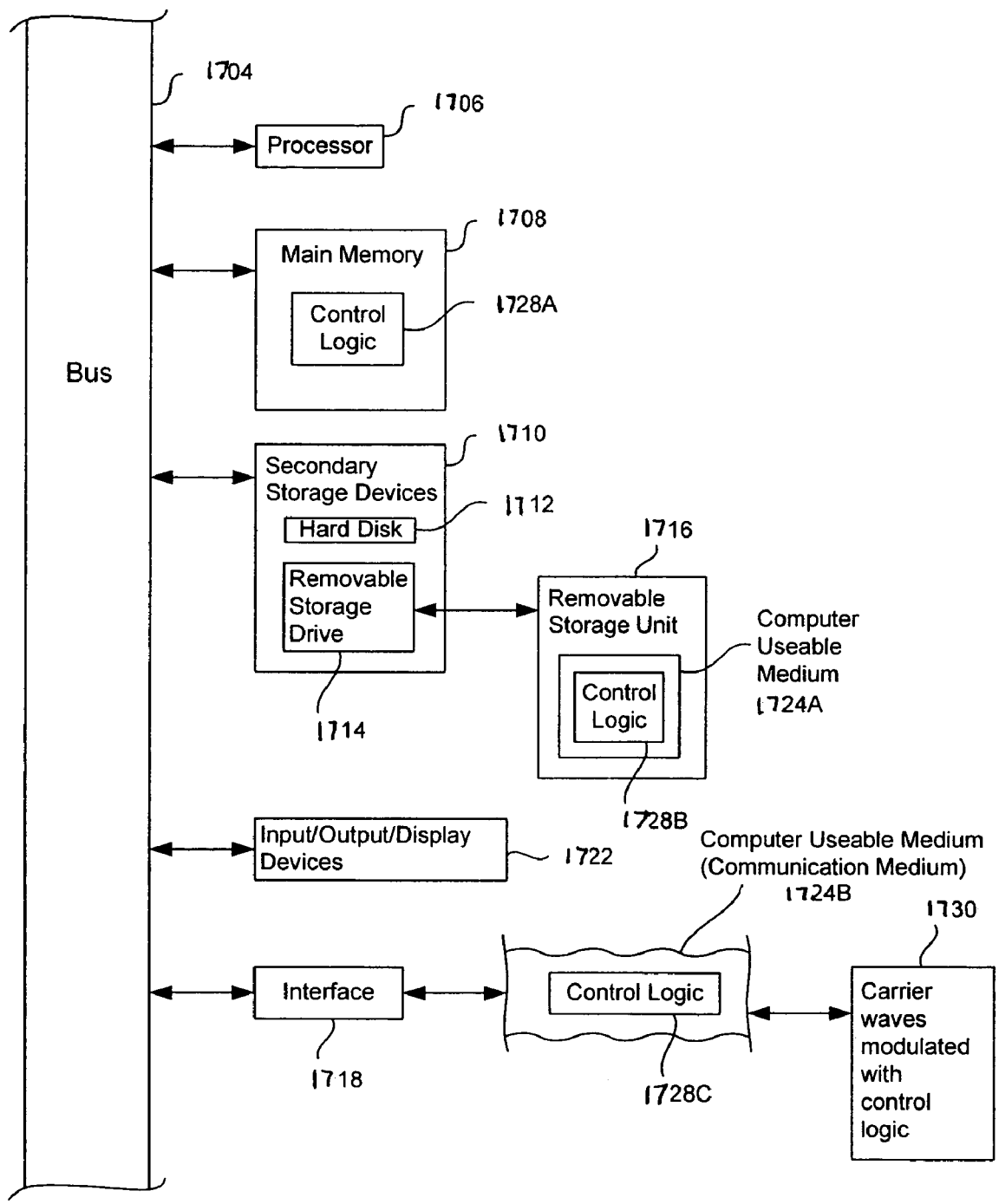
FIG. 17 is a block diagram of an example computer useful for implementing components of the invention.

In an embodiment of the present invention, the system and components of the present invention described herein are implemented using well known servers/computers, such as computer 1702 shown in FIG. 17. For example, computer system 114 and server 116 shown in FIG. 1 can be implemented using computers 1702.

The computer 1702 can be any commercially available and well known computer capable of performing the functions described herein, such as computers available from International Business Machines, Apple, Sun, HP, Dell, Compaq, Digital, Cray, etc.

The computer 1702 includes one or more processors (also called central processing units, or CPUs), such as a processor 1706. The processor 1706 is connected to a communication bus 1704.

The computer 1702 also includes a main or primary memory 1708, such as random access memory (RAM). The primary memory 1708 has stored therein control logic 1728A (computer software), and data.

The computer 1702 also includes one or more secondary storage devices 1710. The secondary storage devices 1710 include, for example, a hard disk drive 1712 and/or a removable storage device or drive 1714, as well as other types of storage devices, such as memory cards and memory sticks. The removable storage drive 1714 represents a floppy disk drive, a magnetic tape drive, a compact disk drive, an optical storage device, tape backup, etc.

The removable storage drive 1714 interacts with a removable storage unit 1716. The removable storage unit 1716 includes a computer useable or readable storage medium 1724 having stored therein computer software 1728B (control logic) and/or data. Removable storage unit 1716 represents a floppy disk, magnetic tape, compact disk, DVD, optical storage disk, or any other computer data storage device. The removable storage drive 1714 reads from and/or writes to the removable storage unit 1716 in a well known manner.

The computer 1702 also includes input/output/display devices 1722, such as monitors, keyboards, pointing devices, etc.

The computer 1702 further includes a communication or network interface 1718. The network interface 1718 enables the computer 1702 to communicate with remote devices. For example, the network interface 1718 allows the computer 1702 to communicate over communication networks or mediums 1724B (representing a form of a computer useable or readable medium), such as LANs, WANs, the Internet, etc. The network interface 1718 may interface with remote sites or networks via wired or wireless connections.

Control logic 1728C may be transmitted to and from the computer 1702 via the communication medium 1724B. More particularly, the computer 1702 may receive and transmit carrier waves (electromagnetic signals) modulated with control logic 1730 via the communication medium 1724B.

Any apparatus or manufacture comprising a computer useable or readable medium having control logic (software) stored therein is referred to herein as a computer program product or program storage device. This includes, but is not limited to, the computer 1702, the main memory 1708, the secondary storage devices 1710, the removable storage unit 1716 and the carrier waves modulated with control logic 1730. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for communicating between an application and a web service, comprising:
a messaging system comprising a first node and a second node, and further comprising a first message queue at the first node and a second message queue at the second node;

a first communication interface coupled between the application and the messaging system; and a second communication interface coupled between the messaging system and the web service;

wherein the first communication interface is configured to receive a web service request from the application, to format the web service request into a Simple Object Access Protocol (SOAP) request message, to include the SOAP request message in a first electronic message, and to transmit the first electronic message to the messaging system;

wherein the messaging system is configured to receive the first electronic message at the first node, to queue the first electronic message at the first message queue, to detect, by the first node, whether connectivity is established between the first node and the second node, to transmit the first electronic message across a communications network to the second node after connectivity is detected by the first node, to queue the first electronic message at the second message queue, and to transmit the first electronic message from the second node to the second communication interface;

wherein the second communication interface is configured to receive the first electronic message from the messaging system, to extract the SOAP request message from the first electronic message, and to transmit the SOAP request message to the web service;

wherein the second communication interface is configured to receive a web service response from the web service, the web service response including a SOAP response message;

wherein the second communication interface is configured to include the SOAP response message in a second electronic message, and to transmit the second electronic message to the messaging system; and wherein the messaging system is configured to receive the second electronic message at the second node, to detect, by the second node, whether connectivity is established between the second node and the first node, and to transmit the second electronic message across the communications network to the first node after connectivity is detected by the second node.

2. The system of claim 1, wherein the second communication interface is configured to transmit the SOAP request message to the web service according to a Hypertext Transfer Protocol (HTTP).

3. The system of claim 1, wherein the communications network comprises the Internet.

4. The system of claim 1, wherein the communications network is an occasionally connected network.

5. The system of claim 1, wherein the web service application is on a mobile device.

6. The system of claim 1,
wherein the messaging system is configured to transmit the second electronic message from the first node to the first communication interface; and
wherein the first communication interface is configured to receive the second electronic message from the messaging system, to extract the SOAP response message from the second electronic message, to decode the SOAP response message into response information, and to transmit the response information to the web service application.

7. The system of claim 6, wherein the second communication interface is configured to receive the SOAP request message from the web service according to a Hypertext Transfer Protocol (HTTP).

8. The system of claim 6, wherein the messaging system comprises:
a first message store at the first node;
a first message delivery module at the first node that is coupled to the first message store;
a second message store at the second node; and
a second message delivery module at the second node that is coupled to the second message store.

9. The system of claim 8, wherein the second message delivery module is configured to receive the second electronic message, and to monitor the communications network for connectivity to the first message delivery module;
wherein the second message store is configured to queue the second electronic message for the second message delivery module;
wherein the second message delivery module is configured to transmit the second electronic message across the communications network to the first message delivery module after the connectivity is detected; and
wherein the first message store is configured to queue the second electronic message.

10. A system, comprising:
a Simple Object Access Protocol (SOAP) request generator configured to receive a web service request from a web service application and to format the web service request into a SOAP request message;
a message generator configured to generate a first electronic message that includes the SOAP request message; and
a communication interface configured to transmit the first electronic message to a messaging module comprising a message queue at a messaging system for storage until connectivity is detected by the messaging module, and to receive a second electronic message from the messaging system, wherein the second electronic message is queued at the messaging system until connectivity is detected by the messaging system.

11. The system of claim 10, the system further comprising:
a SOAP response extractor configured to extract a SOAP response message from the second electronic message; and
a SOAP decoder configured to decode the SOAP response message into response information;
wherein the communication interface is configured to transmit the response information to the web service application.

12. A system comprising:
a Simple Object Access Protocol (SOAP) request extractor configured to extract a SOAP request message from a first electronic message received from a messaging system and dequeued from a message queue; and
a network interface module configured to transmit the SOAP request message to a web service according to a Hypertext Transfer Protocol (HTTP) after connectivity to the web service is detected by the network interface module, wherein the network interface module is configured to receive a web service response from the web service and to transmit a second electronic message based on the web service response to the messaging system when connectivity to the messaging system is detected by the network interface module.

13. The interface of claim 12, the web service response including a SOAP response message, wherein the system further comprises:
a message generator configured to include the SOAP response message in the second electronic message.

14. A method for communicating between an application and a web service, comprising:
- receiving a web service request from the application;
- formatting the web service request into a Simple Object Access Protocol (SOAP) request message;
- generating a first electronic message that includes the SOAP request message;
- transmitting the first electronic message to the messaging system, wherein the messaging system queues the first electronic message at a first message queue in a first node and transmits the first electronic message across a communications network from the first node to a second message queue in a second node after connectivity is detected by the first node,
- receiving the first electronic message from the second node;
- extracting the SOAP request message from the first electronic message;
- transmitting the SOAP request message to the web service;
- receiving a web service response from the web service, the web service response including a SOAP response message;
- generating a second electronic message that includes the SOAP response message; and
- transmitting, the second electronic message to the messaging system, wherein the messaging system is configured to queue the second electronic message at a third message queue in the second node and to transmit the second electronic message across the communications network from the second node to the first node after connectivity is detected by the second node.

15. The method of claim 14, wherein transmitting the SOAP request message to the web service comprises:
- transmitting the SOAP request message to the web service according to a Hypertext Transfer Protocol (HTTP).

16. The method of claim 14, wherein the communications network comprises the Internet.

17. The method of claim 14, wherein the communications network is an occasionally connected network.

18. The method of claim 14, wherein the web service application is on a mobile device, wherein said receiving a web service request from the application comprises:
- receiving the web service request from the application during a synchronization operation for the mobile device.

19. The method of claim 14, further comprising:
- receiving the second electronic message from the messaging system;
- extracting the SOAP response message from the second electronic message;
- decoding the SOAP response message into response information; and
- transmitting the response information to the web service application.

20. The method of claim 19, wherein receiving the web service response from the web service comprises:
- receiving the SOAP request message from the web service according to a Hypertext Transfer Protocol (HTTP).

21. The method of claim 19, further comprising:
- queuing the second electronic message in a message store at the second node;
- monitoring the communications network from the second node for connectivity to the first node; and
- transmitting the second electronic message across the communications network to the first node after the connectivity is detected.

22. A method for an interface between a web service application and a messaging system, comprising:
- receiving a web service request from the application;
- formatting the web service request into a Simple Object Access Protocol (SOAP) request message;
- generating a first electronic message that includes the SOAP request message;
- transmitting the first electronic message to a messaging module comprising a message queue at the messaging system for storage until connectivity with a first communication network is detected by the messaging module; and
- receiving a second electronic message from a second message queue at the messaging system, the second message queue for storage until connectivity with a second communication network is detected by the messaging module, wherein the first communication network connects the messaging system to a web service, and wherein the second communication network connects the messaging system to the web service application.

23. The method of claim 22, further comprising:
- extracting a SOAP response message from the second electronic message;
- decoding the SOAP response message into response information; and
- transmitting the response information to the web service application.

24. A method for an interface between a messaging system and a web service, comprising:
- receiving a first electronic message from the messaging system;
- dequeueing the first electronic message from a message queue;
- extracting a Simple Object Access Protocol (SOAP) request message from the first electronic message;
- transmitting the SOAP request message to the web service according to a Hypertext Transfer Protocol (HTTP) after connectivity from the interface to the web service is detected by the interface;
- receiving a web service response from the web service; and
- transmitting a second electronic message comprising the web service response to the messaging system for storage in a second message queue, the messaging system configured to transmit the second electronic message to a web service application after connectivity to the web service application is detected by the messaging system.

25. The method of claim 24, the web service response including a SOAP response message, further comprising:
- generating the second electronic message that includes the SOAP response message;
- transmitting the second electronic message to the messaging system.

26. A computer readable storage device having instructions stored thereon that, when executed by a computing device, cause the computing device to perform a method comprising:
- receiving a web service request from the application;
- formatting the web service request into a Simple Object Access Protocol (SOAP) request message;
- generating a first electronic message that includes the SOAP request message;
- transmitting the first electronic message to the messaging system, wherein the messaging system queues the first electronic message at a first message queue in a first node and transmits the first electronic message across a communications network from the first node to a second message queue in a second node after connectivity is detected by the first node;

receiving the first electronic message from the second node;

extracting the SOAP request message from the first electronic message;

transmitting the SOAP request message to the web service;

receiving a web service response from the web service, the web service response including a SOAP response message;

generating a second electronic message that includes the SOAP response message; and transmitting the second electronic message to the messaging system, wherein the messaging system is configured to queue the second electronic message at a third message queue in the second node and to transmit the second electronic message across the communications network from the second node to the first node after connectivity is detected by the second node.

27. The computer readable storage medium device of claim 26, the method further comprising:

receiving the second electronic message from the messaging system;

extracting the SOAP response message from the second electronic message;

decoding the SOAP response message into response information; and transmitting the response information to the web service application.

* * * * *

UNITED STATES PATENT AND TRADEMARK OFFICE
CERTIFICATE OF CORRECTION

PATENT NO.        : 8,200,845 B2
APPLICATION NO.   : 11/640854
DATED             : June 12, 2012
INVENTOR(S)       : Abouzour et al.

It is certified that error appears in the above-identified patent and that said Letters Patent is hereby corrected as shown below:

Column 15, Line 26, replace "transmitting," with --transmitting--.

Column 16, Line 50, replace "message;" with --message; and--.

Column 18, Line 3, replace "medium device" with --device--.

Signed and Sealed this
Twenty-fifth Day of September, 2012

David J. Kappos
*Director of the United States Patent and Trademark Office*